July 23, 1968
U. M. GEISSLER
3,393,700
VALVE MECHANISM
Filed June 9, 1966
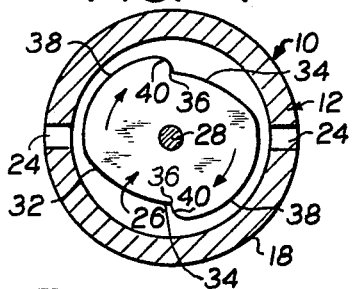
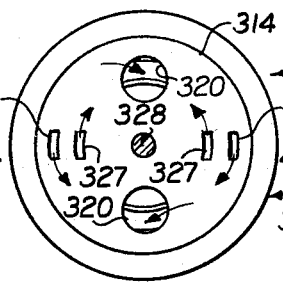
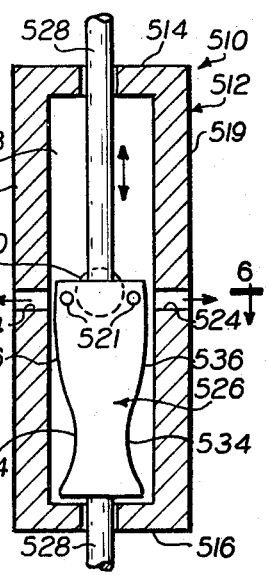
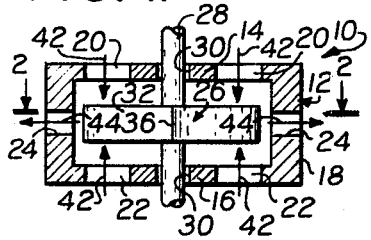
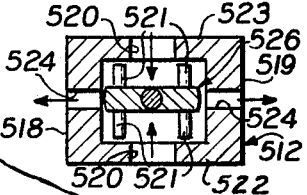
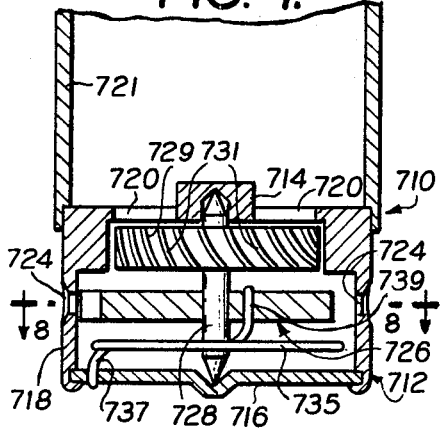
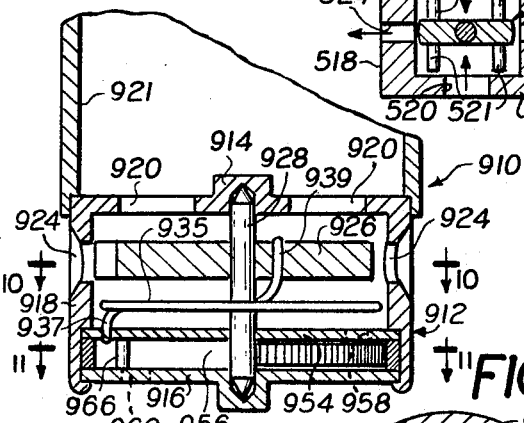
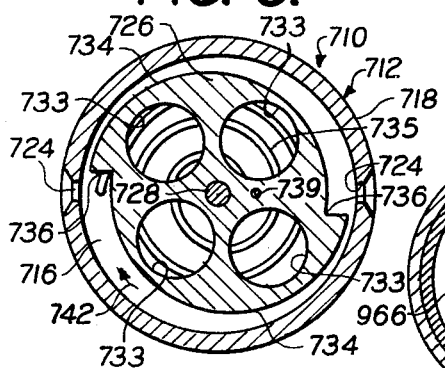
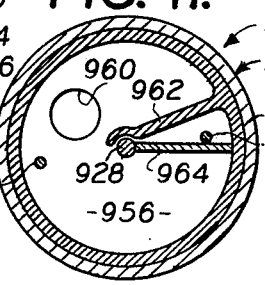
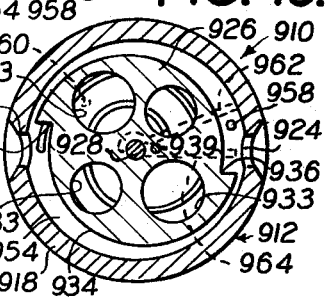
INVENTOR
ULRICH M. GEISSLER
BY
ATTORNEYS.

United States Patent Office 3,393,700
Patented July 23, 1968

1

3,393,700
VALVE MECHANISM
Ulrich M. Geissler, 20 Venetian Way,
Miami Beach, Fla. 33139
Filed June 9, 1966, Ser. No. 556,409
18 Claims. (Cl. 137—504)

This invention relates generally to a valve mechanism and pertains to a valve mechanism of general utility.

In conventional valve mechanism a valve casing is provided with an inlet port and an outlet port. A movable valve member is usually in the valve casing and is adapted selectively to connect the inlet and outlet ports thereby to control the rate of flow of a fluid through the mechanism. A severe disadvantage asociated with these types of structural arrangements is that one surface of the movable valve member adjacent the fluid inlet is subjected to a high pressure while the surface of the movable member adjacent to the outlet port is subjected to a low pressure. Accordingly, an unbalanced and varied fluid force is created, applied to and operates on the movable valve member, which affects the free and steady or constant movement thereof. These variations in the rate of flow of the fluid may cause deleterious fluttering and hammering of the movable valve members which, in turn, causes further undesired variations in the fluid flow.

Accordingly, the desideratum of the present invention is to provide a valve mechanism that obviates the creation of unbalanced forces acting on the valving surfaces of the valve member to result in a constant metering of fluid flow through the valve mechanism for any given setting of the valve.

Another object of the present invention is to provide a valve mechanism in which the forces normally acting on the valve as a result of the dynamic flow of fluid through the mechanism are cancelled so that they functioning of the valve remains undisturbed.

It is highly desirable to control the rate of flow of a fluid through the valve mechanism. Usually this requires a number of complex devices which monitor the rate of flow of the fluid and which are operable to change the flow when the rate does not fall within preselected limits. Accordingly, a further object of the present invention is to provide a simple metering value construction which is operable to eliminate variations in the rate of flow of a fluid to maintain the fluid flow substantially constant.

In accordance with the above objects, the valve mechanism of the present invention includes a valve housing having a fluid inlet port means and opposed fluid outlet port means. Because the valve mechanism will operate with liquid or gasses, the term "fluid" may be used to cover the use of one or the other. A movable valve member is received in the valve housing in spaced relation to the walls thereof so that a fluid flowing through the valve housing completely surrounds the valve member. The valve member is provided with a non-uniform surface that is adapted to be moved relative to selected ones of the port means to vary the distance between the port means and the valve member thereby to change the area of the passage therebetween, to regulate or vary the flow of a fluid through the valve mechanism. Means are provided for moving the valve member relative to the plurality of ports to effect the desired flow rate.

A feature of the present invention is to provide a valve construction having a valve member which is completely surrounded by the fluid flowing through the valve mechanism thereby to reduce unbalanced forces on the value member.

Other objects and advantages of the present invention will become more apparent from a consideration of the following detailed description when taken in conjunction with the accompanying drawings, in which:

2

FIG. 1 is a vertical sectional view of the valve mechanism constructed according to the present invention;

FIG. 2 is a sectional view of FIG. 1 taken along lines 2—2 thereof;

FIG. 3 is a top plan view of a modified embodiment of a valve mechanism;

FIG. 4 is a sectional view of FIG. 3 taken along lines 4—4 thereof;

FIG. 5 is a vertical sectional view of another modified embodiment of a valve mechanism constructed in accordance with the present invention;

FIG. 6 is a sectional view of FIG. 5 taken along lines 6—6;

FIG. 7 is a vertical sectional view of an automatically operable metering valve mechanism embodying the features of the valve shown in FIG. 1;

FIG. 8 is a sectional view taken along lines 8—8 of FIG. 7;

FIG. 9 is a vertical sectional view of a modified embodiment of an automatically operable metering valve mechanism;

FIG. 10 is a sectional view taken along lines 10—10 of FIG. 9, to a reduced scale; and FIG. 11 is a sectional view of the valve mechanism of FIG. 9 taken along lines 11—11 and to a reduced scale.

The valve mechanism of the present invention is designated generally by the numeral 10 in FIGS. 1 and 2 and includes an enclosed valve housing 12 having a top wall 14, a bottom wall 16 and a circular peripheral wall 18. Provided in the top and bottom walls 14 and 16 are a plurality of inlet ports 20 and 22. Provided in the side wall 18 are a plurality of diametrically opposed outlet ports 24. The set of inlet ports 20 and 22 are adapted to be connected with a source of fluid under pressure (not shown) and the set of outlet ports 24 are adapted to be connected to a controlled device (not shown) so that a fluid flowing through the valve mechanism 10 traverses a path from the inlet ports 20 and 22 to the outlet ports 24.

Rotatably received within the valve housing 12 is a non-uniform or cam-shaped valve member 26. The member 26 is fixedly mounted on an axially extending shaft 28 that projects beyond and may be bearing supported in the top and bottom walls 14 and 16 through centrally located bores 30. Suitable gaskets and bushings (not shown) may be provided about the shaft 28 to rotatably support the shaft in the housing 12 and to prevent leakage of fluid through the bores 30. Rotation of the shaft 28 will effect a concomitant rotation of the valve member 26. The rotation of the shaft 28 may be produced in any conventional manner, such as by the use of levers, gears, ratchet means, etc.

As shown in FIGS. 1 and 2, the valve member 26 is spaced in relation from the interior walls of the housing 12 so that a fluid flowing through the housing always completely encompasses to envelope and surround the valve member. The valve member 26 has a non-uniform radius that provides an undulating or contoured peripheral wall 32 that defines a metering or valving surface that is spaced from but adjacent and opposite to the outlet ports 24 to define a fluid passageway therebetween. The valve member 26 is adapted to be moved relative to the outlet ports 24 to vary the distance between the valving surface 32 of the valve member 26 and the outlet ports thereby to change the area of the fluid passageway defined therebetween.

More specifically, the peripheral wall 32 is symmetrical over each half of its surface.

The wall 32 includes portions 34 which begin at 36 and which are spaced from the axis of the member 26 by a gradually increasing radius. The portions 34 merge smoothly with curved outer portions 38 which are radially spaced from the axis of the valve member 26 a greater distance than the portions 34. The portions 38 are connected to 36 by sharply curved portions 40 as seen in FIG. 2. Each combination of surfaces 34, 36, 38 and 40 defined along the wall 32 of the valve member 26 form a single valve or metering surface. The valve member 26 is here provided with a set of two such valving surfaces to correspond in number with those of the outlet port means 24. If additional outlet port means were provided there would be provided a corresponding respective valving surface for each such additional outlet port means.

In operation, fluid flows dynamically through the inlet ports 20 and 22 into the housing 12 toward the member 26, as indicated by the arrowhead 42 in FIG. 1. The fluid flows completely about the upper and lower surfaces of the valve member 26 and between the wall 18 of the housing 12 and the wall 32 of the member and is exhausted from the housing through the outlet ports 24, as indicated by the arrowheads 44. Since the forces produced by the fluid flowing dynamically through the ports 20 is opposite and equal to the forces produced by the fluid flowing through the ports 22 (i.e., the ports 20 and 22 are connected to the same source), there will be no unbalanced axial forces acting on the member 26. Additionally, the outlet ports 24 are equally spaced from each other at the metering or valving surface of the valve member 26. Since but two such ports 24 are here disclosed for illustrative purposes only, they are shown diametrically opposed to each other.

As the fluid flows dynamically through the housing from the inlet port means to the outlet port means it creates forces that act upon the surfaces of the valve member. Unless such forces are balanced and cancelled they quickly damage the valve member causing it to move out of balance, resulting in an inconsistent or eccentric metering of the fluid passing through the fluid passageway. The balancing or equal spacing of the outlet port means 24 relative to the valve metering surface 32 obviate the creation of unbalancing fluid forces acting on the surface. Because the outlet port means are always balanced on their relative spacing and with respect to the metering surface 32 they permit the balanced exhaust from the housing of the dynamically moving fluid. In this manner of placement of the outlet port means 24 the fluid forces acting on the valve surface 32 are equalized and cancelled so that the valve surface moves freely and unaffected by the fluid forces.

When it is desired to change the rate of flow of a fluid through the valve 10, the shaft 28 may be selectively rotated by means external to the valve housing 12 to cause movement of the member 26 in a clockwise or a counterclockwise direction. For example, when the portions 38 of the peripheral wall 32 are adjacent the outlet ports 24, the passage therebetween will be constricted thereby restricting the flow of fluid. However, when the portions 34 of the wall 32 are moved adjacent the outlet ports 24, the passageway therebetween will be substantially greater thereby allowing a greater quantity of fluid to flow through the valve 10 per unit time. Thus, the rate of fluid flow may be easily changed simply by rotating the shaft 28.

In the embodiment of the present invention shown in FIGS. 1 and 2, the valve member 26 is adapted to be rotated 180° relative to the outlet ports 24. Accordingly, stops may be provided in the valve housing 12 to limit the movement of the valve member 26 between 0° and 180°. Additionally, while only one pair of outlet ports has been disclosed, more than one pair may be provided. However, where more than one pair of outlet ports is utilized, the wall 32 would have to be divided into a number of symmetrical sections equal to the number of outlet ports. For example, if two pairs of opposed outlet ports are provided, the peripheral wall 32 would have to be symmetrical over each quarter of its surface. Moreover, if it is desired to change the characteristics of the valve 10, a differently shaped valve metering or valving surface may be provided at the peripheral wall 32.

FIGS. 3 and 4 illustrate a modified embodiment of the valve mechanism of the present invention wherein the outlet and inlet port means are provided in the same wall. Thus, the valve mechanism shown in FIGS. 3 and 4 is designated generally by the numeral 310 and includes an enclosed valve housing 312 having a top wall 314, a bottom wall 316 and a circular peripheral wall 318. Received in the top and bottom walls 314 and 316 are a set of a plurality of diametrically opposed aligned pairs of inlet port means 320 shown in FIG. 3 only. Also provided in the top and bottom walls 314 and 316 are a plurality of equally spaced or diametrically opposed aligned sets of outlet port means 324, 325 and 327, 329.

Similar to the valve mechanism 10, the valve mechanism 310 is provided with a cam-shaped valve member 326 which is fixedly mounted on an axially extending rotatable shaft 328. The member 326 is in spaced relation to the walls of the housing 312 to define a fluid passageway therebetween so that a fluid flowing through the housing completely surrounds the valve member. The member 326 is provided with upper and lower surfaces 331 and 333 having variable heights as distinguished from the radially directed undulating or contoured peripheral wall of the valve 10.

More specifically, the member 326 comprises a central web portion 348 having an outer circular section 350 and an inner circular section 352. The sections 350 and 352 are symmetrical about the central web portion 348 and the upper and lower peripheral edge walls thereof are adapted to move adjacent to and respectively align with the outlet port means 324, 325 and 327, 329. As shown in FIG. 4, the upper and lower peripheral walls of the section 350 form metering or valving surfaces that are relatively high at 354 and slope downwardly towards the central portion 348 to a minimum height at 358 and then curve upwardly at 360. On the other hand, the upper and lower peripheral walls of the inner section 352 form metering or valving surfaces that curve upwardly to a maximum height at 362 which is adjacent to the low point 358 on the outer section 350, and then curve downwardly toward the central portion 358 to a portion of minimum height at 364.

The operation and function of the valve mechanism 310 is similar to that of the valve 10. That is, a rotation of the shaft 328 will cause different portions of the valving surfaces of the outer and inner sections 350 and 352 to move relative to and adjacent to their respective outlet ports 324, 325 and 327, 329 thereby changing the area of the fluid passageway and consequently the volume of fluid flowing between the outlet ports and the valving surfaces of the valve members 326. Thus, the rate of fluid flow will change in proportion to the change in the area of the fluid passageway. It will be noted that the respective inlet and outlet port means are provided in opposed or equally balanced sets. This provision results in balancing or cancelling the forces created by the dynamically moving fluid so that the metering or valving surfaces of the valve member 326 are subject to equalized forces throughout their extent.

The embodiment of the present valve mechanism shown in FIGS. 5 and 6 is similar in function and operation to the embodiment shown in FIGS. 1–4 with the exception that the valve member is axially movable rather than being rotatable in the valve housing. More specifically, the valve mechanism is designated generally by the numeral 510 in FIGS. 5 and 6 and includes an enclosed valve housing 512 having a top wall 514, a bottom wall 516, a front wall 522, a rear wall 523, and opposed side walls 518 and 519. Approximately centrally located in the front and rear walls 521 and 523 are aligned or equally spaced inlet port means 520. Aligned and equally spaced outlet port means 524 are provided in the respective side walls 518 and 519.

Slidably mounted in the valve housing 512 and spaced from the walls thereof is a cam-shaped valve member 526 which is adapted to be operated axially by shafts 528 which extend through the top and bottom walls 514 and 516 and which are slidable with respect thereto. Laterally extending pins 521 are provided on the valve member 526 and are adapted to engage and ride along the interiors of the front and rear walls 522 and 523 to prevent rotation of the valve member.

The side walls or edges of the valve member 526 are symmetrical and form metering or valving surfaces that curve concavely inward at 534 and convexly outward at 536 to provide a non-uniform surface which is spaced from the inner walls of the housing 512. By this arrangement the valve member 526 remains completely enveloped in the dynamically moving fluid and forms a variable fluid passageway between its valving surfaces and the outlet port means in the same manner as the prior described embodiments.

As in the operation of the prior embodiments, each of the metering or valving surfaces controls the rate of flow of fluid through the housing and from the inlet through the outlet by selective operation of the control means 528 by varying the extent of the fluid passageway at its corresponding respective outlet means. Therefore, as the valving surface of the valve member 526 is moved axially in the housing 512 relative to the outlet ports 524, the area of the passage between the member 526 and the ports 524 changes accordingly. The length of the valve members 526 is slightly in excess of one-half of the length of the housing 512 so that a portion of the member 526 will always be opposite the outlet ports 524, thereby to continuously regulate the fluid flow.

It is to be noted that in the embodiments shown in FIGS. 1–6, the inlet port means may be interchanged with the outlet port means without affecting the operation of the valves. That is, the source of fluid under pressure may be connected with the ports heretofore designated as outlet ports and the controlled device may be connected to the ports heretofore designated as the inlet ports. In either case, the operation of the valves will be substantially the same.

In many systems it is highly desirable to automatically maintain the rate of flow of a fluid constant or within preselected limits. Usually devices which perform this function are unduly complex and costly. However, FIGS. 7 and 8 illustrate a valve mechanism that is relatively uncomplicated in construction. Thus, the valve mechanism there shown is designated generally by the numeral 710 and includes a valve housing 712 having a top wall 714, a bottom wall 716 and a circular peripheral wall 718. Provided in the top wall 714 are equally spaced or diametrically opposed inlet port means 720. Received in the wall 718 are equally spaced or diametrically opposed outlet port means 724. The inlet ports 720 are adapted to be connected with a source of fluid under pressure through a conduit 721 which may be included as part of the valve housing 712.

Rotatably received in the valve housing 712 is a shaft 728. Fixedly received on the shaft 728 is a cam-shaped valve member 726 that is positional in alignment with and adjacent the outlet ports 724. Similarly fixedly received on the shaft 728 is an operator member 729 which is positioned below the inlet ports 720. Provided on the peripheral wall of the operator member 729 are a plurality of circumferentially spaced vaned portions 731 which are positioned in the path of and to be engaged by the fluid flowing dynamically through the inlet ports 720 toward the outlets 724, thereby to cause rotation of the shaft 728, as will be apparent.

As shown in FIG. 8, the valve member 726 is provided with a plurality of through bores 733 to provide for the flow of the fluid through an about the member 726. The peripheral wall of the member 726 is symmetrical over each half of its circumference and comprises metering or valving surface portions 734 which begin at 736 and which are spaced radially from the axis of the member by a gradually increasing radius similar to that disclosed in the embodiment of FIGS. 1 and 2. It should be apparent to those skilled in the art that the construction of the valve member 726 and its operation as well as its spaced relationship to the interior walls of the housing 712 and the fluid port means is similar to that of the prior described embodiments. Therefore, a complete redescription of the same would be redundant and unnecessary. Accordingly, similar to the operation of the valve mechanism shown in FIGS. 1–4, as the valve member 726 is rotated relative to the outlet ports 724 the area of the fluid passage therebetween is selectively varied and changes thereby to change the rate of flow of a fluid from the fluid inlet means to and outward through the set of equally spaced fluid outlet means.

A spiral spring 735 is received in the valve housing 712 and includes an end 737 which is fixedly received in the bottom wall 716 and an end 739 which is fixedly received in the valve member 726. The spring 735 is operable to bias the valve member 726 to a preselcted position relative to the outlet ports 724 to effect a normal preselected control of the rate of flow of the fluid in the manner noted below. The direction of the tension of the spring 735 is opposite to the turning force produced by the dynamically flowing fluid acting on the vaned portions of the vaned member 729. Thus, the tension of the spring 735 normally opposes the movement of the vaned member 729 that rotates in response to the fluid forces acting on its vaned portions 731, to rotate the valve member 726, through the shaft 728, to a preselected position relative to the outlet ports 724 to obtain a desired rate of fluid flow. That is, the fluid will flow through the inlet ports 720 and downwardly, between the member 726 and the wall 718 of the housing and out of the valve housing 712 through the outlet ports 724. At the same time a portion of the fluid will flow through the bores 733 in the valve member 726 and upwardly between the member and the wall 718 and through and out of the outlet ports 724 to the controlled device (not shown). Thus, the downward and upward forces produced by flow of the fluid on the valve member 726 will substantially cancel each other so that no unbalanced forces will act on the member. In addition, because the set of outlet means 724 are equally spaced relative to each other and about and relative to the corresponding and respective metering or valving surfaces, the forces created by the dynamic movement of the fluid are balanced at such surfaces. This cancels all unbalancing fluid forces that might otherwise hamper the consistent operation of the valve mechanism. This action results in an automatic varying and gradual closing of the fluid passageway, constricting the same and thereby reducing the rate of flow of the fluid to the equally spaced set of the outlets. If the rate of flow of the fluid decreases, the tension in the spring 735 tends to return the valve member 726 and its valving surfaces to their normal positions. This return rotation of the valve member 726 will be in a direction opposite to the arrowhead 742 thereby permitting an increase in the rate of flow of the fluid through the fluid passageway and between the fluid inlet and outlet means.

FIGS. 9, 10, 11 illustrate a modified embodiment of a valve mechanism 910 similar in function to that of the valve 710. Accordingly identical elements will be designated by numerals in the 900 series but including the same tens and units digits as the valve mechanism 710. Provided within the valve housing 912 in spaced relation to the bottom wall 916 is a separating partition 954 which defines an operating chamber 956. The partition 954 receives a shaft 928 on which the valve member 926 is mounted. Intermediate the valve member 926 and the partition wall 954 is a spring 935 that has one of its ends 937 mounted in the partition wall 954 while the other end of the spring is mounted above the valve number 926.

Provided in the partition wall 954 is a bore 958 of relatively small diameter. The bore provides direct communication between the housing 912 above it and thereby permits fluid to flow from the housing above into the chamber 956. Defined in the bottom wall 916 of the chamber 956 is an opening 960 which provides for the exhaust of fluid from the chamber 956. The opening 960 is of materially larger diameter than that of the bore 958 for a purpose which will be presently described.

A radially disposed divider or baffle plate 962 is provided in the chamber 956 and extends from the wall 918 to a point spaced from the shaft 928. Connected to and for selectively operation of the shaft 928 and consequentially the valve member 926 is a valve operated arm 964 that terminates in slight spaced relationship to the wall 918. The arm 964 is movable within the chamber 956 between opposed upstanding stops 966 that are angularly spaced from each other a distance of less than 180°. Thus during the movement of the arm 964 the same is limited in angular rotation by its engagement with the stops 966, thereby preventing the arm or the valve member 926 from rotation in excess of an angle of 180°. The bore 958 (see FIG. 10) is positioned between the baffle plate 962 and the arm 964 when the arm is positioned in its normal inactive position as shown in FIGS. 10, 11.

In operation the arm 964 is normally biased to its inactive position in engagement with the one stop 966 adjacent to the baffle plate 962. The biasing effect is created by the tension of the spring 935 acting thereupon. During the operation of the valve mechanism 910 fluid flowing between the sets of inlet and outlet means will be permitted to enter into the chamber 956 by way of the communicating bore 958. The entering fluid then exerts a pressure or force on the portion of the arm 964 facing the bore 958. This fluid force thereby causes the arm 964 to rotate and concomitantly therewith the valve member 926. The spring 935 tends to oppose the rotation of the arm 964 and attempts to retain the same in its normal position. However, when the force of the fluid exerted on the opposing portion of the arm 964 is greater than that of the tension of the opposing spring 935 the arm then rotates angularly away from the bore 958. As the arm 964 rotates it displaces fluid before it. This fluid passes outward of the chamber 958 through the bore 960 which then may recirculate the fluid back again to the inlet means 920. The tension of the spring 935 is adjusted and predetermined so that the valve member 926 will be positioned to maintain a predetermined or desired rate of flow of fluid through the valve mechanism 910.

If the pressure of fluid between the fluid inlets and outlets increase, the pressure against the arm 964 increases above the tension in the spring 935 thereby causing the arm to move to a new position. Hence, the member 926 also moves to selectively vary the area of the fluid passage between the ports 924 and the metering surface of the member 926, similar to the operation of the valve 710 until the desired flow rate for a corresponding pressure is obtained. On the other hand, the arm 964 moves in the opposite direction when the flow rate initially decreases until the rate of the fluid flow again reaches the preselected level. Thus, the valve 910 also provides a means of automatically maintaining the rate of flow of a fluid at a preset level, while the valve member remains enveloped in the operating but metering fluid. All during these functions the fluid forces created within the housing are balanced at the metering surfaces of the valve member 926 by the equal spacing of the fluid outlets 924.

It will be recognized that the valve mechanism 910 is automatically responsive to the presence of the moving fluid. An increase of pressure in the valve mechanism 910 can result in an increase or decrease in the flow of fluid according to the predetermined shape of the valve member 926. With the use of the valve member 926 as illustrated in FIG. 10 the flow of fluid will be caused to decrease as the fluid pressure increases between the inlet and outlet means. However, if the metering or valving surface 934 is oppositely contoured from that shown an opposite result will be obtained.

While preferred embodiments of the invention have been shown and described herein it will be obvious that numerous omissions, changes and additions may be made in such embodiments without departing from the spirit and scope of the invention.

What is claimed is:

1. A valve mechanism for controlling the flow of a fluid comprising
   a valve housing,
   at least one inlet port in said valve housing adapted to be connected to a source of inlet fluid,
   a plurality of opposed outlet ports in said valve housing,
   a movable valve member in said housing in spaced relation to the housing walls whereby a fluid in said housing completely surrounds said valve member,
   said valve member having a non-uniform surface adapted to be moved relative to said plurality of outlet ports to vary the distance between said outlet ports and said valve member to regulate the flow of a fluid through said plurality of outlet ports,
   and moving means connected to said valve member for selectively moving said valve member to a preselected position relative to said plurality of outlet ports.

2. A valve mechanism as in claim 1, wherein said valve housing includes a side wall, said valve member being rotatably mounted in said valve housing, said plurality of outlet ports being located in said side wall, said non-uniform surface comprising a radially undulating peripheral wall in spaced relation to said outlet ports in said side wall, whereby rotation of said valve member causes different portions of said undulating peripheral wall to move adjacent said plurality of outlet ports to regulate the flow of a fluid thorugh said outlet ports.

3. A valve mechanism as in claim 1, in which said valve housing includes a top and a bottom wall, said top and bottom walls being provided with said plurality of opposed outlet ports, said valve member being mounted in said valve housing for rotation with respect thereto, said non-uniform surface comprising undulating upper and lower surfaces, whereby rotation of said valve member causes different portions of said upper and lower undulating surfaces to move adjacent said plurality of outlet ports in said top and bottom walls to regulate the flow of a fluid through said outlet ports.

4. A valve mechanism, according to claim 1, in which said valve housing includes side walls, said side walls being provided with said plurality of opposed outlet ports, said valve member being mounted for axial movement in said valve housing, said non-uniform surface comprising an undulating surface extending in an axial direction, whereby axial movement of said valve member causes different portions of said undulating surface to move adjacent said plurality of outlet ports to regulate the flow of a fluid through said valve.

5. A valve mechanism as in claim 4, and means engageable between said valve member and housing to prevent rotation of said valve member in said valve housing.

6. A valve mechanism according to claim 1, in which said valve housing includes a side wail, said plurality of opposed outlet ports being located in said side walls, means for rotatably mounting said valve member in said valve housing, and said moving means comprising a vaned member connected to said valve member and positioned in the path of flow of fluid from said inlet port to said outlet port to rotate said valve member through a preselected angle proportional to the rate of flow of a fluid through said valve.

7. A valve mechanism in accordance with claim 6, and biasing means for biasing said valve member to a predetermined position.

8. A valve mechanism in accordance with claim 1, wherein said valve housing includes a side wall, said plurality of outlet ports being located in said side wall, shaft means for rotatably mounting said valve member in said valve housing, a chamber in said valve housing, an inlet means and an outlet means in said chamber to provide for the flow of a fluid therethrough, and said moving means including an arm in said chamber fixedly connected to said shaft means and adapted to be rotated by a fluid flowing through said chamber through an angle proportional to the rate of flow of a fluid through said valve to cause concomitant movement of said valve means, and biasing means in said valve housing for biasing said valve means to a preselected position relative to said plurality of outlets.

9. A valve mechanism comprising
first fluid means,
second fluid means,
a housing connected with said first and second fluid means and adapted to contain fluid for dynamic flow between said first and second fluid means,
a valve in said housing spaced from a selected fluid means to define a fluid passageway therebetween and spaced within said housing for complete envelopment in fluid in said housing,
said valve having a non-uniform valving surface selectively movable relative to said selected fluid means whereby the fluid passageway is varied according to the extent of the space between said non-uniform valve surface and said selected fluid means to variably regulate the flow of fluid between said first and second fluid means,
said selected fluid means being at least a pair and said pair being oppositely disposed relative to each other such that fluid forces created at said valving surface by the flow of fluid between said first and second fluid means are in opposition and cancel each other, and means to selectively move said valving surface relative to said selected fluid means, 10. A valve mechanism as in claim 9, and biasing means for biasing said valving surface to a preselected position.

11. A valve mechanism as in claim 9,
said means to selectively move said valving surface having a portion movable in response to fluid forces to move said valving surface selectively in accordance with the forces of the fluid.

12. A valve mechanism as in claim 11,
said means to selectively move said valving surface including a disc having said portion and being connected with said valving surface,
said portion including a plurality of vanes spaced circumferentially about and extending radially outward from said disc.

13. A valve mechanism as in claim 11,
a chamber in said housing and including openings defined therein to communicate fluid between said chamber and housing,
said means to selectively move said having surface including an arm in said chamber connected with said valving surface, said portion being a surface provided on said arm and against which the forces created by the pressure of fluid act.

14. A valve mechanism comprising
a fluid containing housing,
a first set of fluid means to supply a fluid to said housing,
a second set of fluid means to exhaust fluid from said housing to provide for a dynamic flow of fluid between said first and second fluid means,
a valve in said housing and being smaller than the interior of said housing to be completely enveloped in fluid in said housing,
said valve having a non-uniform metering surface that is constantly spaced from but operable to be variably spaced from a selected one of said sets of fluid means,
said space between said surface and said selected set of fluid means defining a fluid passageway variable in area in accordance with the variable spacing of said surface from said selected set of fluid means,
said selected set of fluid means being arranged relative to said valve surface to equalize fluid forces acting on said surface as a result of the dynamic flow of fluid between said first and second fluid means,
and means connected with said valve to operate said metering surface to variably space the same from said selected set of fluid means.

15. A valve mechanism, as in claim 14,
said last named means being movable in response to the forces created by the dynamic flow of fluid between said first and second fluid means to operate said metering surface.

16. A valve mechanism, as in claim 15,
said second set of fluid means comprising a plurality of equally spaced ports defined in said housing and being said selected set of fluid means.

17. A mechanism, as in claim 16,
said valve having a plurality of non-uniform metering surfaces, each defining a variable fluid passageway with a respective one of said plurality of ports.

18. A mechanism, as in claim 14, said last named means being movable to operate said metering surface in response to any change in the rate of fluid flow between said first and second fluid means with respect to a predetermined rate of fluid flow.

References Cited

UNITED STATES PATENTS

| | | | |
|---|---|---|---|
| 1,339,284 | 5/1920 | Petry | 137—625.46 |
| 2,164,057 | 6/1939 | Fink | 137—625.46 XR |
| 2,441,220 | 5/1948 | Dixon | 137—504 |
| 2,820,477 | 1/1958 | Dorsak et al. | 137—425.46 XR |
| 3,092,144 | 6/1963 | Green | 137—625.3 |
| 3,136,339 | 6/1964 | Champion | 137—625.46 XR |

HENRY T. KLINKSIEK, *Primary Examiner.*

R. J. MILLER, *Assistant Examiner.*